(12) United States Patent
Lee et al.

(10) Patent No.: US 9,083,029 B2
(45) Date of Patent: Jul. 14, 2015

(54) BATTERY PACK

(75) Inventors: Hyun-Ye Lee, Yongin-si (KR);
Tae-Yong Kim, Yongin-si (KR);
Myung-Chul Kim, Yongin-si (KR);
Shi-Dong Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 293 days.

(21) Appl. No.: 12/816,789

(22) Filed: Jun. 16, 2010

(65) Prior Publication Data

US 2011/0151311 A1    Jun. 23, 2011

Related U.S. Application Data

(60) Provisional application No. 61/289,988, filed on Dec. 23, 2009.

(51) Int. Cl.
*H01M 2/10* (2006.01)
*H01M 2/12* (2006.01)
*H01M 10/052* (2010.01)

(52) U.S. Cl.
CPC .......... *H01M 2/1077* (2013.01); *H01M 2/1016* (2013.01); *H01M 2/12* (2013.01); *H01M 2/1252* (2013.01); *H01M 2/1061* (2013.01); *H01M 10/052* (2013.01); *Y02T 10/7011* (2013.01)

(58) Field of Classification Search
CPC ............ H01M 2/1241; H01M 2/1016; H01M 2/1061; H01M 2/1071; H01M 2/1077
USPC .................................................... 429/97, 99
See application file for complete search history.

(56) References Cited

U.S. PATENT DOCUMENTS

| 4,957,829 | A | * | 9/1990 | Holl ................................ 429/99 |
| 5,140,744 | A |   | 8/1992 | Miller |
| 6,326,103 | B1 |  | 12/2001 | Ido et al. |
| 7,128,999 | B1 | * | 10/2006 | Martin et al. ................... 429/99 |
| 2004/0079714 | A1 | * | 4/2004 | Andrew et al. ............... 211/49.1 |
| 2005/0058891 | A1 | * | 3/2005 | Marraffa ......................... 429/99 |
| 2006/0292437 | A1 | * | 12/2006 | Matsumoto et al. ............ 429/56 |
| 2007/0178369 | A1 | * | 8/2007 | Conrardy et al. ............. 429/100 |

(Continued)

FOREIGN PATENT DOCUMENTS

| EP | 1 990 861 A1 | 11/2008 |
| GB | 1 526 279 | 9/1978 |
| GB | 1526279 A * | 9/1978 |
| JP | 10-106610 | 4/1998 |

(Continued)

OTHER PUBLICATIONS

KIPO Office action dated Oct. 24, 2011 issued in JP 10-2010-0074981, 4 pages.

(Continued)

*Primary Examiner* — Ula C Ruddock
*Assistant Examiner* — Scott J Chmielecki
(74) *Attorney, Agent, or Firm* — Christie, Parker & Hale, LLP (57) ABSTRACT

A battery pack includes a plurality of battery modules stacked together, at least one of the plurality of battery modules having a plurality of unit battery cells stacked together; and a housing including at least one side support comprising a first support having a longitudinal axis extending in a first direction and a second support having a longitudinal axis extending in a second direction crossing the first direction; and a pair of end plates coupled to respective longitudinal ends of the first support.

18 Claims, 10 Drawing Sheets

(56) References Cited

U.S. PATENT DOCUMENTS

2008/0107962 A1* 5/2008 Uh .............................. 429/164
2009/0017367 A1 1/2009 Marubayashi

FOREIGN PATENT DOCUMENTS

| JP | 2000-149900 | 5/2000 |
| JP | 2001-015090 | 1/2001 |
| JP | 2009-21048 A | 1/2009 |
| KR | 10-2006-0086119 | 7/2006 |

OTHER PUBLICATIONS

English Machine Translation of JP 2001-015090, 59 pages.

Extended European Search Report for corresponding European Patent Application No. 10196682.8-1227, dated Mar. 28, 2011.

European Office action dated Jan. 24, 2013, for corresponding European Patent application 10196682.8, (6 pages).

European Office action dated Jun. 5, 2012, for corresponding European Patent application 10196682.8, (5 pages).

Chinese Office Action dated Mar. 24, 2014 issued in corresponding Chinese Patent Application No. 201010622294.3, 8 pages, with accompanying English translation, 10 pages.

SIPO Office action dated Oct. 17, 2014, with English translation, for corresponding Chinese Patent application 201010622294.3, (18 pages).

* cited by examiner

BATTERY PACK

RELATED APPLICATIONS

This application claims the benefit of U.S. Provisional Patent Application No. 61/289,988, filed on Dec. 23, 2009, in the United States Patent and Trademark Office, the entire disclosure of which is incorporated herein by reference.

BACKGROUND

1. Field

One or more embodiments of the present invention relate to a battery pack, and more particularly, to a battery pack formed by vertically or horizontally stacking battery modules each of which is formed by stacking a plurality of unit battery cells.

2. Description of the Related Art

Secondary batteries refer to batteries that are rechargeable and dischargeable, unlike primary batteries that are not rechargeable. Secondary batteries are widely used in high-tech electronic devices such as cellular phones, notebook computers, and camcorders, and may also be used as batteries in automobiles.

Secondary batteries typically include an electrode assembly and an electrolyte. The electrode assembly includes an anode plate, a cathode plate, and a separator. The electrolyte includes lithium ions in many cases. The anode plate and the cathode plate of the electrode assembly may be provided with electrode tabs that protrude outward.

The electrode assembly may be received in a case, and electrode terminals may be exposed to the outside of the case. The electrode tabs may protrude outside the electrode assembly to be electrically connected to the electrode terminals. The case may be cylindrical or polygonal.

A battery module may be formed by horizontally or vertically stacking a plurality of unit secondary battery cells. One battery pack may be formed by vertically and/or horizontally stacking a plurality of battery modules.

SUMMARY

One or more embodiments of the present invention include a battery pack formed by vertically and/or horizontally stacking battery modules, each of which is formed by stacking a plurality of unit battery cells, to reduce deflection of the battery modules.

In one embodiment, a battery pack includes a plurality of battery modules stacked together, at least one of the plurality of battery modules having a plurality of unit battery cells stacked together; and a housing including at least one side support comprising a first support having a longitudinal axis extending in a first direction and a second support having a longitudinal axis extending in a second direction crossing the first direction; and a pair of end plates coupled to respective longitudinal ends of the first support.

In one embodiment, the longitudinal axis of the second support extends generally in a direction from a first one of the battery modules to a second one of the battery modules, and the second support of a first one of the battery modules may contact a second one of the battery modules. Further, the at least one side support may have a single integral structure or be separate structures coupled together.

Additionally, in one embodiment, each of the battery modules further includes a first frame and wherein the second support is coupled to the first frame. In one embodiment, the second support of a first one of the battery modules overlaps with the second support of a second one of the battery modules and may be welded thereto and also to the first frame. Further, the longitudinal axis of the second support of a first one of the battery modules may be substantially co-linear with the longitudinal axis of the second support of a second one of the battery modules.

In another embodiment, the second support has a coupling flange extending from an edge thereof in a direction away from the plurality of unit battery cells, and the coupling flange may have an opening adapted to receive a fastener. Further, in one embodiment, the at least one side support further includes a bent portion adapted to be fixed to one end plate of the pair of end plates.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

A battery pack 10 according to an embodiment of the present invention may be formed by vertically and/or horizontally stacking one or more battery modules 100. Each of the battery modules 100 may be formed by vertically and/or horizontally stacking one or more unit battery cells 110.

When the battery pack 10 is formed by vertically stacking the plurality of battery modules 100 without additional support, the battery modules 100 may be deflected due to the weight of the plurality of unit battery cells 110. Also, oscillation of the battery modules 100 may occur due to the deflection of the battery modules 100.

The unit battery cells 110 of the battery modules 100 of the battery pack 10 may be supported at sides by using side supports 140. Each of the side supports 140 may include a horizontal support 140*a* and a vertical support 140*b*, and the vertical supports 140*b* may support vertical movements of the battery modules 100 at sides.

Accordingly, the vertical supports 140*b* may reduce deflection and oscillation of the battery modules 100 by supporting portions of the battery modules 100 to be deflected.

Figure 1:
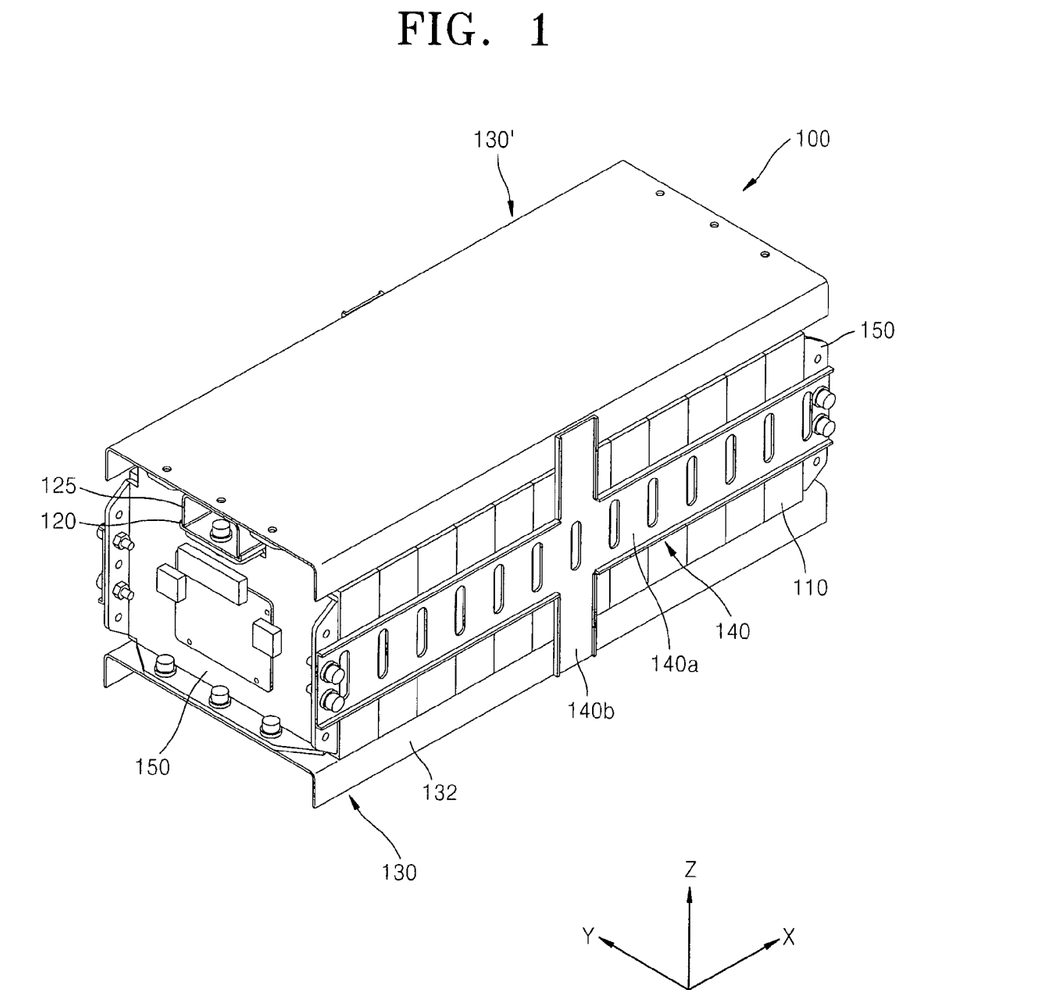
FIG. 1 is a perspective view of a battery module, which is formed by horizontally stacking a plurality of unit battery cells, according to an embodiment of the present invention.
Figure 2:
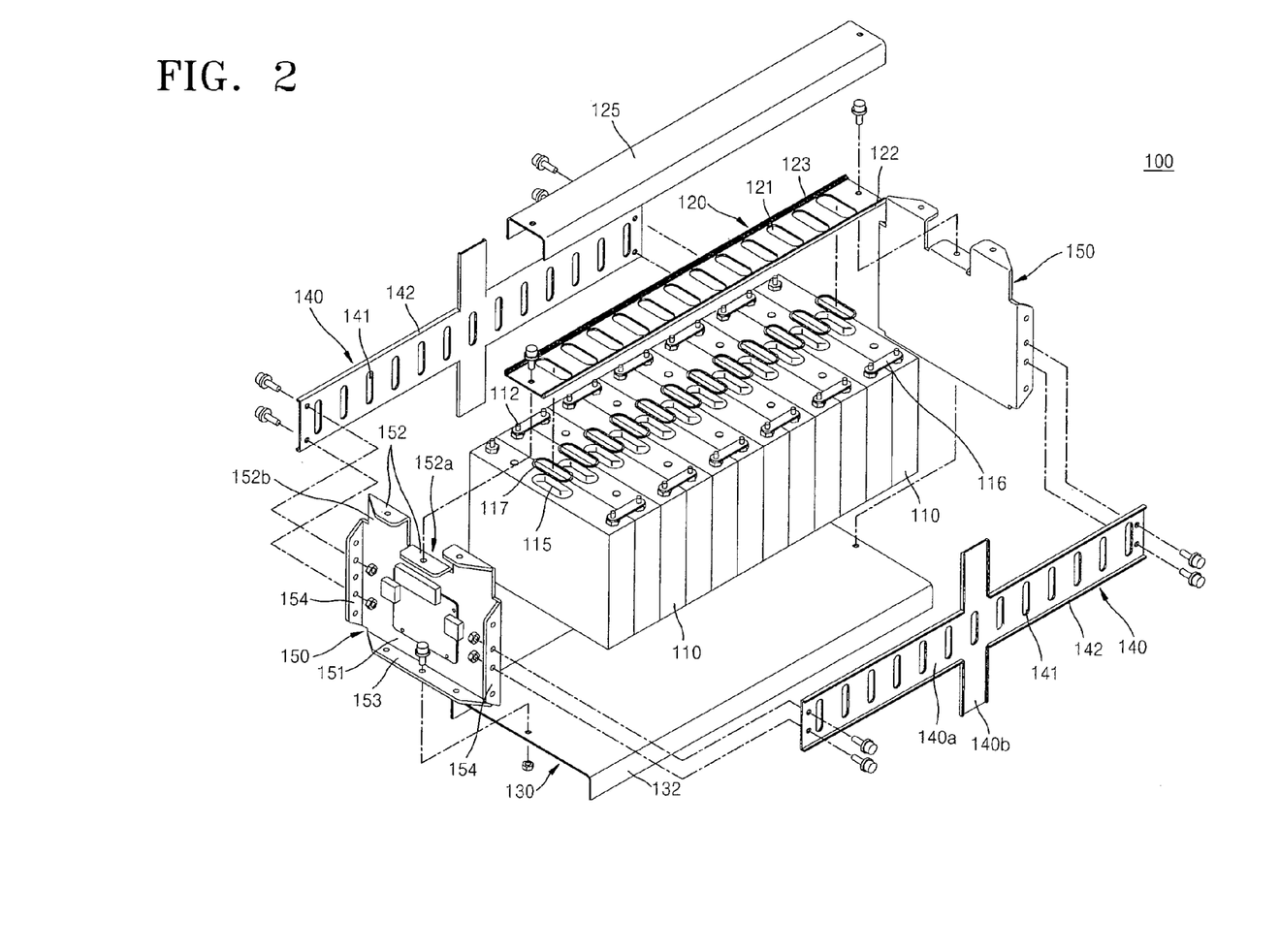
FIG. 2 is an exploded perspective view illustrating elements of the battery module of FIG. 1.

FIG. 1 is a perspective view of one of the battery modules 100, which is formed by horizontally stacking the plurality of unit battery cells 110, according to an embodiment of the present invention. FIG. 2 is an exploded perspective view illustrating elements of the battery module 100 of FIG. 1. The battery pack 10 is formed by vertically and/or horizontally stacking the plurality of battery modules 100.

Referring to FIGS. 1 and 2, the battery module 100 may include the plurality of unit battery cells 110, an upper frame 120, a lower frame 130, the side supports 140, and a pair of end plates 150.

The battery module 100 may be formed by stacking the plurality of unit battery cells 110 in a first direction. The upper frame 120 is located on the unit battery cells 110, which are stacked in the first direction, and supports the unit battery cells 110 in a second direction. The lower frame 130 is located under the unit battery cells 110, which are stacked in the first direction, and supports the unit battery cells 110 upwardly.

The side supports 140 are located on side surfaces of the unit battery cells 110, which are stacked in the first direction, and support the unit battery cells 110 on the side. The pair of end plates 150 are located, one at either end of the unit battery cells 110, which are stacked in the first direction, and support the unit battery cells 110 at both ends.

Each of the side supports 140 includes a first support 140*a* and a second support 140*b*. The first support 140*a* supports the unit battery cells 110 of the battery module 100 and extends along its longitudinal axis in a third direction. The second support 140*b* supports the unit battery cells 110 of the battery module 100 and extends along its longitudinal axis in the second direction to cross the longitudinal axis of the first support 140*a*.

Here, the first direction may be an X direction, the second direction may be a Z direction, and the third direction may be a Y direction. When the battery pack 10 is disposed horizontally, the X direction may be a horizontal direction, the Y direction may be an internal direction of the battery module 100, and the Z direction may be a vertical direction. However, the present embodiment is not limited thereto, and the first through third directions may vary according to the arrangement of the battery pack 10.

The first support (or the horizontal support) 140*a* internally supports the unit battery cells 110 that are stacked horizontally. The second support (or the vertical support) 140*b* that internally and/or vertically supports the unit battery cells 110 that are stacked horizontally.

The vertical support 140*b* may support a portion of the battery module 100 to be deflected to the side, thereby making it possible to reduce deflection and oscillation of the battery module 100.

Figure 3:
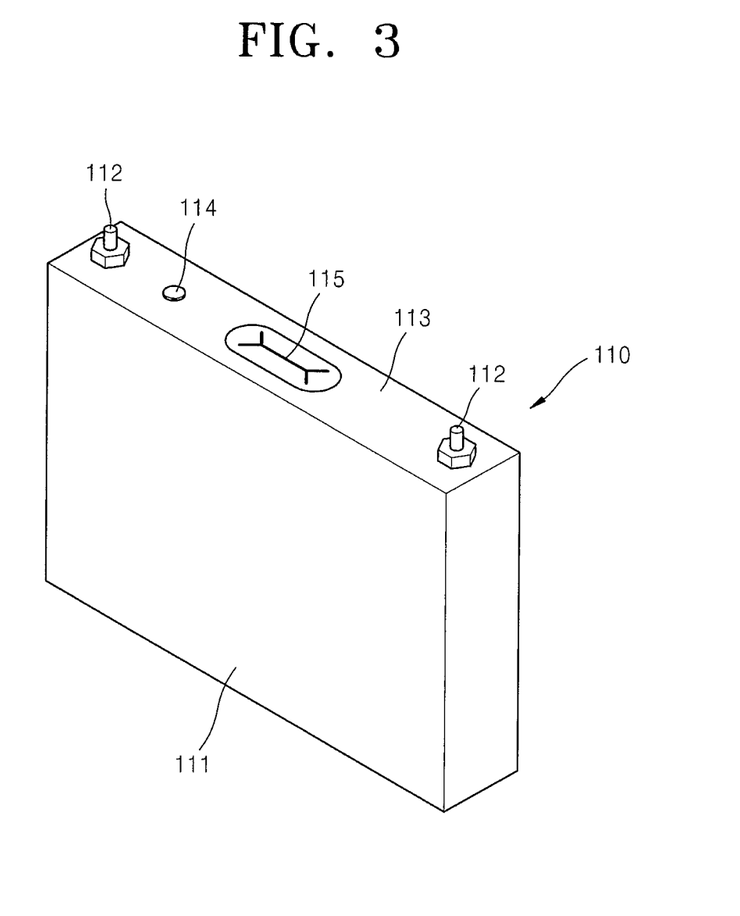
FIG. 3 is a perspective view of one of the unit battery cells included in the battery module of FIG. 1.

FIG. 3 is a perspective view illustrating one of the unit battery cells 110 included in the battery module 100 of FIG. 1. The plurality of unit battery cells 110 may be horizontally stacked to form the battery pack 10, and each of the plurality of unit battery cells 110 may be cylindrical or polygonal as shown in FIG. 3. However, the present embodiment is not limited thereto, and each of the plurality of unit battery cells 110 may have various shapes including a circular shape and a pouch shape.

The unit battery cell 110 may be a secondary battery. A general secondary battery may include an electrode assembly and an electrolyte. The electrode assembly may include an anode plate, a cathode plate, and a separator. The electrolyte may include lithium ions. The anode plate and the cathode plate of the electrode assembly may protrude outward to be electrically connected to a current collector.

The electrode assembly may be received in a case 111, and electrode terminals 112 may be exposed to the outside of the case 111. The current collector electrically connected to the anode plate and the cathode plate may be electrically connected to the electrode terminals 112 in the case 111. The case 111 may be cylindrical or polygonal. The unit battery cell 110 may include a plurality of electrode assemblies in one case 111.

The plurality of unit battery cells 110 may be horizontally stacked to form the battery module 100. In the battery module 100, the electrode terminals 112 of neighbouring unit battery cells 110 may be electrically connected to one another. The electrode terminals 112 of the neighbouring unit battery cells 110 may be electrically connected to one another by bus bars 116.

The neighbouring unit battery cells 110 may be arranged in such a manner that anodes and cathodes alternate. The plurality of unit battery cells 110 may be connected in parallel, in series, or in parallel and series. Accordingly, the plurality of unit battery cells 110 may be continuously connected to form one battery module 100. The connection structure and the number of the unit battery cells 110 may be determined in consideration of capacities of recharge or discharge requested when the unit battery cells 110 are designed.

A cap plate 113 may be coupled to an opening of the case 111. The cap plate 113 may be a thin plate. An electrolyte inlet through which the electrolyte is injected into the case 111 may be formed in the cap plate 113. The electrolyte inlet may be sealed with a sealing cap 114 after the electrolyte is injected.

A vent member 115 having grooves may be formed in the cap plate 113 so that the vent member 115 may be broken when a preset internal pressure is reached. When the upper frame 120 is located on the unit battery cells 110 that are horizontally stacked, an exhaust outlet 121 of the upper frame 120 may be located over the vent member 115.

The unit battery cells 110 may be lithium-ion secondary batteries as described above. However, the present embodiment is not limited thereto, and the unit battery cells 110 may be various batteries including nickel-cadmium secondary batteries, nickel-hydrogen secondary batteries, and lithium batteries.

The electrode assembly of each of the unit battery cells 110 containing lithium expands or contracts when recharge or discharge occurs. The expansion and contraction of the electrode assembly may apply a physical force to the case 111. Accordingly, the case 111 may physically expand or contract according to the expansion or contraction of the electrode assembly.

The case 110 may be deformed due to repeated expansion and contraction. The volumetric expansion may increase resistance, thereby lowering the efficiency of the unit battery cells 110. Accordingly, the pair of end plates 150 may be located at ends of the plurality of unit battery cells 110.

The upper frame 120, the lower frame 130, and the side supports 140 may be coupled to upper, lower, and side surfaces of the end plates 150 and may apply compression the unit battery cells 110 and thereby prevent the unit battery cells from horizontally expanding.

The end plates 150 may be installed at both the ends of the battery module 100. The end plates 150 contact outer surfaces of unit battery cells 110 located at both ends of the battery module 100 so as to support the unit battery cells 110 that are stacked.

Each of the end plates 150 may include a base plate 151 and flanges 152, 153, and 154. The base plate 151 has a size large enough to cover the outer shape of each of the unit battery cells 110. The base plate 151 is substantially square in FIG. 3, but the present embodiment is not limited thereto.

The flanges 152, 153, and 154 may be bent from the base plate 151 away from the unit battery cells 110. The flanges 152, 153, and 154 may include an upper flange 152, a lower flange 153, and side flanges 154. The upper flange 152 is coupled to the upper frame 120. The lower flange 153 is coupled to the lower frame 130. The side flanges 154 are coupled to the side supports 140.

Figure 4:
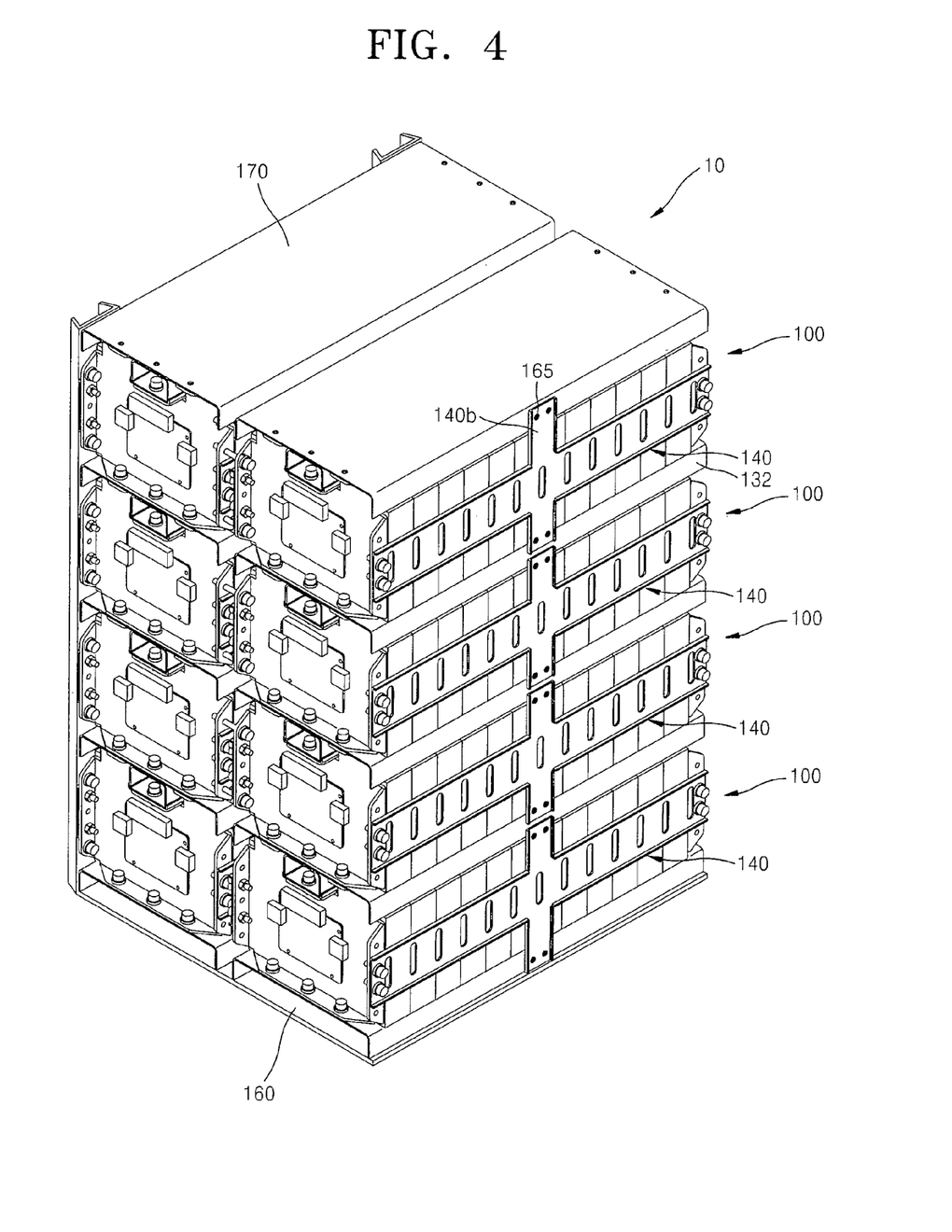
FIG. 4 is a perspective view of a battery pack according to an embodiment of the present invention.

The battery modules 100 may be vertically and/or horizontally stacked to form the battery pack 10. Neighbouring battery modules 100 may be supported by one another because the end plates 140 of the neighbouring battery modules 100 are coupled to one another.

The upper flange 152 of a current battery module 100 may be coupled to a lower flange 130' of an upper battery module 100. The lower flange 153 of the current battery module 100 may be coupled to the lower frame 130. In FIG. 1, the lower frame 130' stacked on the current battery module 100 is additionally illustrated.

The upper flange 152, the lower flange 153, and the side flanges 154 may be screwed onto the upper frame 120, the lower frame 130, and the side supports 140, respectively, with bolts and nuts. However, the present embodiment is not limited thereto, and the upper, lower, and side flanges 152, 153, and 154 may be coupled to the upper frame 120, the lower frame 130, and the side supports 140 in various ways including welding.

The upper frame 120 may be disposed on the plurality of unit battery cells 110 that are stacked horizontally, and may be coupled to the upper flange 152 of each of the end plates 150. The exhaust outlet 121 is formed in the upper frame 120 to correspond to the vent member 115 of each of the unit battery cells 110.

Upper frame bent portions 122 are bent from both edges of the upper frame 120 in a longitudinal direction. Sealing members 123 may be located on inner surfaces of the upper frame bent portions 122. The sealing member 123 may be formed of an elastic member such as rubber. The upper frame 120 may be coupled to a cover 125 with the sealing members 123 interposed therebetween to form a gas passage for discharging sealed gas.

The upper frame 120 and the cover 125 may degas in a sealed state, or may induce degassing even in an incompletely sealed state. Since gas generated in the unit battery cells 110 may be accompanied with an explosion or a rapid chemical reaction, and the amount of the gas is explosively increased in a short time. Accordingly, once a degassing duct for discharging gas is formed in the battery pack 10, the gas may be easily discharged.

In order to discharge gas from the vent member 115 through the exhaust outlet 121 of the upper frame 20 without affecting an adjacent secondary battery cell 110, a sealing ring 117 may be disposed between the upper frame 120 and the vent member 115.

The sealing ring 117 may be, for example, an O-ring. Grooves 152a in which the upper frame 120 is to be seated are formed in the middle of upper edges of the end plates 150. Accordingly, the exhaust outlet 121 of the upper frame 120 may contact each of the unit battery cells 110. The upper frame 120 may be coupled to the upper flanges 152 that are located to correspond to the grooves 152a of the end plates 150.

Each of the sealing rings 117 located between the unit battery cells 110 and the upper frame 120 may have a sufficient thickness. Accordingly, when the upper frame 120 is coupled to the end plates 150, the upper frame 120 applies a pressure to the unit battery cells 110 to compress the sealing rings 117 located between the upper frame 120 and the unit battery cells 110 and to make the upper frame 120 and the unit battery cells 110 closely contact each other.

The lower frame 130 is located under the unit battery cells 110 to support the weight of the plurality of unit battery cells 110, and is connected to the lower flanges 152 of the end plates 150. The lower frame 130 may include lower frame bent portions 132 that are bent away from the unit battery cells 110 in order to bear the weight of the unit battery cells 110. The lower frame bent portions 132 may extend downward.

The side supports 140 may be located on side surfaces of the unit battery cells 110 to support the unit battery cells 110 at sides. Each of the side supports 140 may include the horizontal support 140a and the vertical support 140b.

The horizontal support 140a may extend with a predetermined width from one end plate 140 to the other end plate 140 in a first direction. The vertical support 140b may be located on a side surface of the battery module 100 between the battery modules 100 that are vertically stacked and extend in a second direction crossing the first direction.

Accordingly, the horizontal support 140a internally supports the unit battery cells 110 that are stacked horizontally. The vertical support 140 internally and/or vertically supports the unit battery cells 110 that are stacked horizontally.

The vertical support 140b and the horizontal support 140a may be integrally formed with each other for ease of assembly. In this case, compared to the case where the vertical support 140b is separated from the horizontal support 140a and is inserted into the unit battery cells 110, the horizontal support 140a closely contacts side surfaces of the unit battery cells 110, thereby making it possible to more firmly support the unit battery cells 110.

Alternatively, the vertical support 140b may be separated from the horizontal support 140a. Even in this case, the horizontal support 140a and the vertical support 140b may be coupled to each other by welding to more firmly support sides of the stacked unit battery cells 110.

Each of the side supports 140 included in one battery module 100 includes one horizontal support 140a and one vertical support 140b in FIG. 3. However, the present embodiment is not limited thereto, and one side support 140 may have a plurality of horizontal supports 140a and/or a plurality of vertical supports 140b to enhance a side supporting force.

The vertical support 140b may be connected to and supported by the lower frame bent portions 132. The vertical support 140b may be fixed to the lower frame bent portions 132 by welding.

Alternatively, the vertical support 140b may be screwed onto the lower frame bent portions 132 with fastening elements such as bolts and nuts. However, the present embodiment is not limited thereto, and the vertical support 140b may be fixed to the lower frame bent portions 132 in various other ways.

The vertical supports 140b of the battery modules 100 that are stacked vertically may alternate with each other. Alternatively, the vertical supports 140b of the battery modules that are stacked vertically may be aligned with each other. FIG. 4 illustrates that the vertical supports 140b of the battery modules 100 that are stacked vertically are aligned with each other. In this case, each of the lower frame bent portions 132 may be divided into an upper area and a lower area, and the upper area may be connected to a lower end of the vertical support 140*b* of an upper battery module 100 and the lower area may be connected to an upper end of the vertical support 140*b* of a lower battery module 100. For example, upper and lower ends of adjacent vertical supports 140*b* and each of the lower frame bent portions 132 may overlap with each other and may be welded. The vertical supports 140*b* fixed by welding portions 165 to the lower frame bent portions 132 support vertical loads, thereby supporting the weight of the battery modules 100 and preventing deflection of the battery modules 100.

The vertical support 140*b* may have one end supported by the lower frame 130 of a current battery module 100 and the other end supported by the lower frame 130 of an upper battery module 100. To this end, the lower frame 130 may have a width similar to that of the unit battery cells 110. If the width of the lower frame 130 is slightly greater or less than the width of the unit battery cells 110, a connection portion of the vertical support 140*b* with the lower frame 130 may be bent so as to correct the width difference.

Alternatively, the width of the lower frame 130 may be slightly less than the width of the unit battery cells 110, and the vertical support 140*b* may have no bent portions. In this case, due to a difference in the widths of the lower frame 130 and the unit battery cells 110, the unit battery cells 110 may be supported with a pressure applied to the unit battery cells 110. Accordingly, the vertical support 140*b* may more firmly support the unit battery cells 110 in a vertical direction.

One or more through-holes 141 may be formed in the side supports 140 to reduce the weight of the side supports 140. Also, each of the side supports 140 may include side support bent portions 142 that are bent away from the unit battery cells 110 to increase the strength against bending.

The battery module 100 may further include the cover 125 that is put on the upper frame 120 of the battery module 100. The cover 125 may have a gas discharge duct through which gas is discharged by covering the upper frame 120 of the battery module 100.

There are various ways of forming the gas discharge duct by covering the upper frame 120 of the battery module 100. For example, the upper frame 120 may be integrally formed with the cover 125 in a longitudinal direction to form a pipe. The height of the upper frame 120 covered by the cover 125 may not exceed extensions 152*b* of both upper ends of the battery module 100 so as to achieve a compact size.

The battery pack 10 is formed by vertically and/or horizontally stacking the battery modules 100, and the stacked battery modules 100 are fixed to a base frame 160. A cover frame 170 is located on an uppermost battery module 100 from among the stacked battery modules 100, so that upper ends of the vertical supports 140*b* may be connected to the cover frame 170. The cover frame 170 may have the same shape as the lower frame 130 included in each of the battery modules 100.

Figure 5:
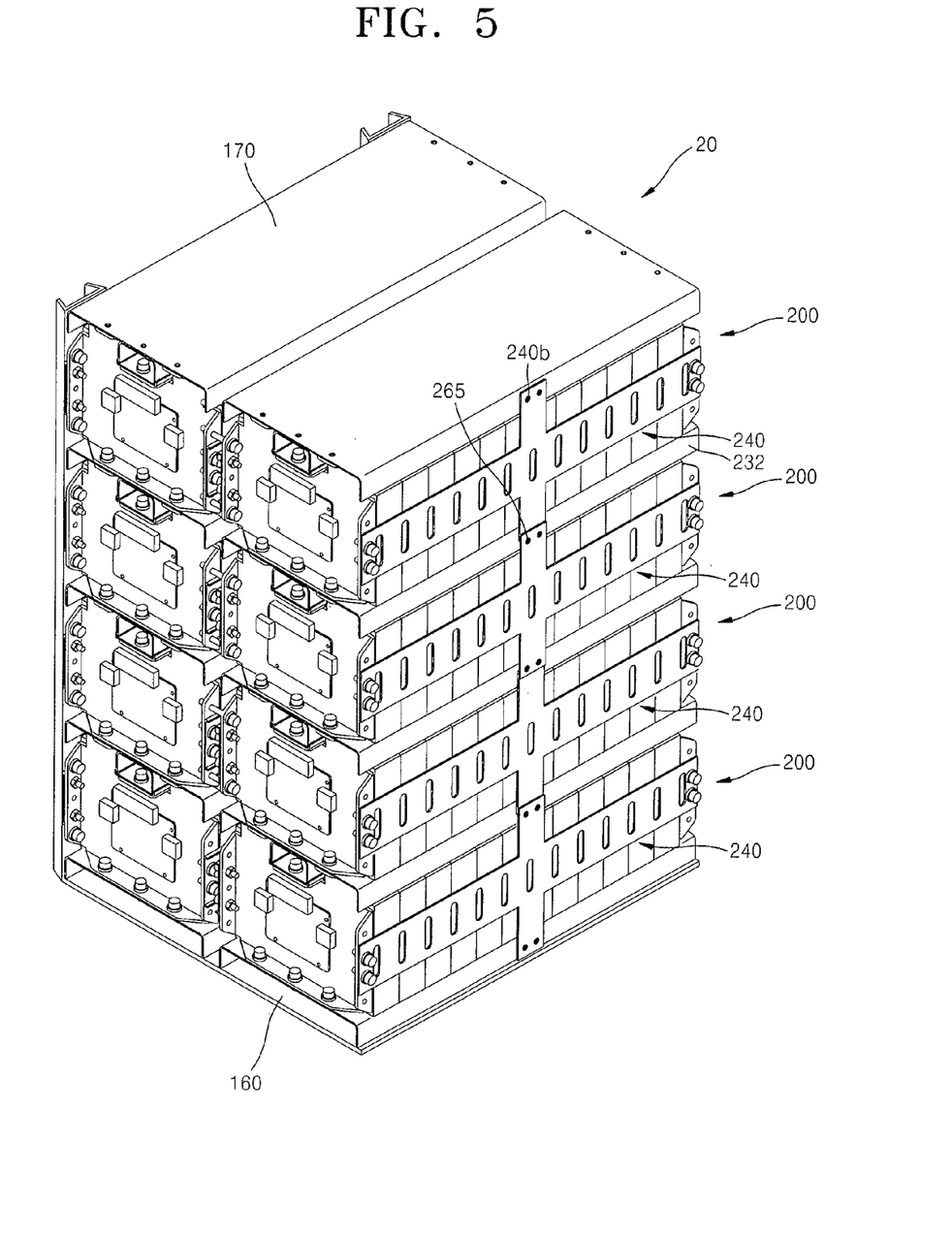
FIG. 5 is a perspective view of a battery pack according to another embodiment of the present invention.

Alternatively, the vertical supports 140*b* of the battery modules 100 that are stacked vertically may partially overlap with one another. FIG. 5 illustrates that vertical supports 240*b* of battery modules 200 that are vertically stacked partially overlap with one another. Referring to FIG. 5, an upper end of the vertical support 240*b* of a current battery module 200 overlaps with a lower end of the vertical support 240*b* of an upper battery module 200 and a lower end of the vertical support 240*b* of the current battery module 200 overlaps with an upper end of the vertical support 240*b* of a lower battery module 200. The vertical supports 240*b* of the battery modules 200 which partially overlap with one another in this way may be wielded to one another. Lower frame bent portions 232 as well as the upper and lower ends of the vertical supports 240*b* may be welded at this time. The vertical supports 240*b* fixed by welding portions 265 to the lower frame bent portions 232 support vertical loads, thereby supporting the weight of the battery modules 200 and preventing deflection of the battery modules 200.

Figure 6:
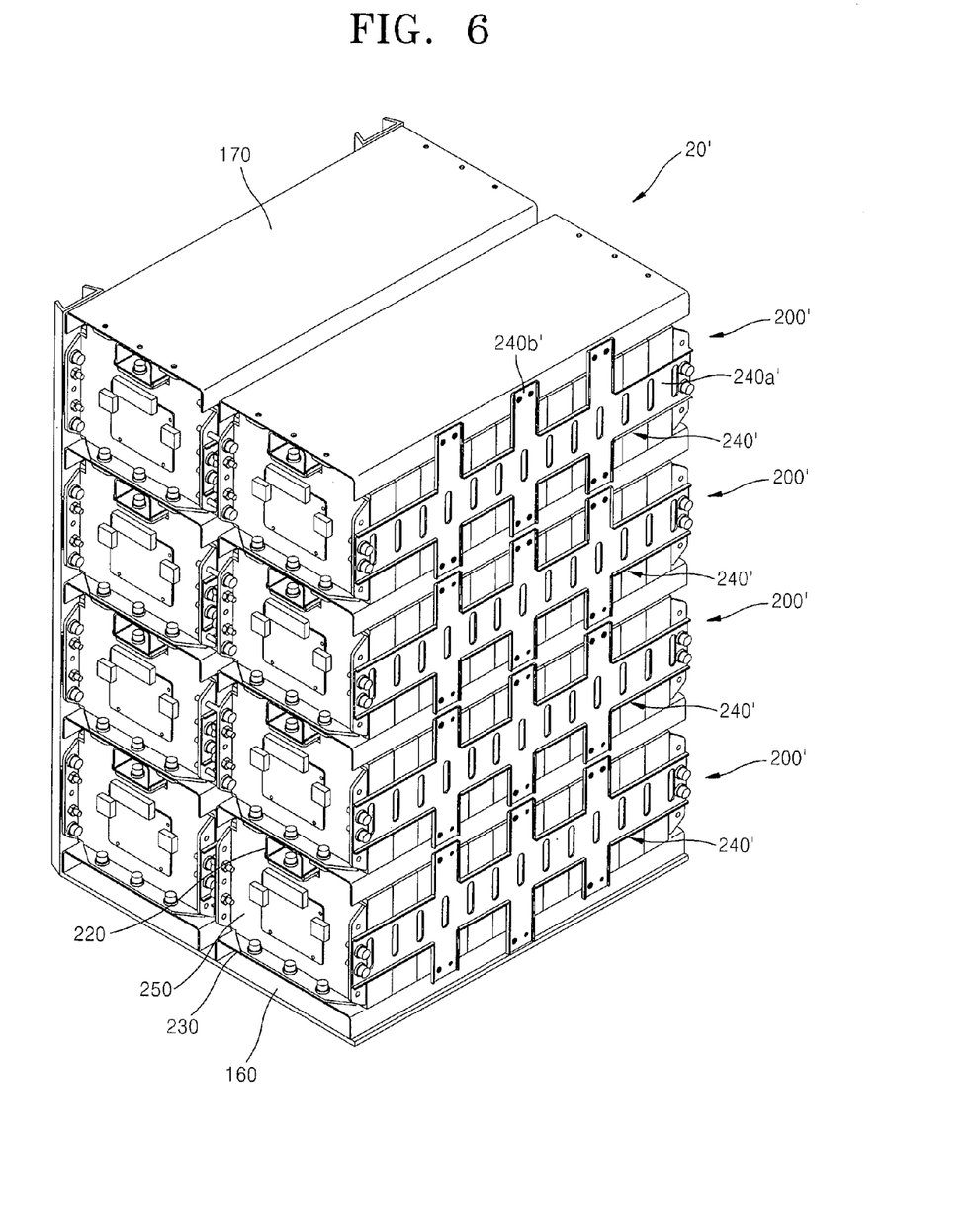
FIG. 6 is a perspective view of a battery pack according to another embodiment of the present invention.

FIG. 6 is a perspective view of a battery pack 20 according to another embodiment of the present invention. Referring to FIG. 5, the battery pack 20 includes one horizontal support 240*a* and a plurality of, for example, three, vertical supports 240*b*.

The battery pack 20 of FIG. 6 is the same as the battery pack 10 of FIGS. 1 through 4 except the following explained below. Accordingly, like elements for performing the same functions as those of the battery pack of FIG. 1 are denoted by like reference numerals and a detailed explanation thereof will not be given.

Referring to FIG. 6, the battery pack 20 may be formed by vertically and/or horizontally stacking battery modules 200'. Each of the battery modules 200 may include a plurality of unit battery cells 210, an upper frame 220, a lower frame 230, side supports 240', and end plates 250.

Each of the side supports 240' may include a horizontal support 240*a'* and a vertical support 240*b'*. The horizontal support 240*a'* may extend with a predetermined width from one end plate 240' to the other end plate 240'. The vertical support 240*b'* may be located at a side between the battery modules 200' that are vertically stacked.

Accordingly, the horizontal support 240*a'* may internally support the unit battery cells 210 that are horizontally stacked. The vertical support 240*b'* may internally and/or vertically support the unit battery cells 210 that are horizontally stacked.

Accordingly, the vertical support 240*b'* may support a portion of the battery module 200' to be deflected. Accordingly, the vertical support 240*b'* may reduce deflection and oscillation of the battery module 200'.

One of the side supports 240' may include a plurality of horizontal supports 240*a'* and/or a plurality of vertical supports 240*b'* to enhance an internal and/or vertical supporting force at a side. However, in FIG. 6, one side support 240' includes one horizontal support 240*a'* and a plurality of, for example, three, vertical supports 240*b'*.

The vertical support 240*b'* may be separated from the horizontal support 240*a'*. Even in this case, the horizontal support 240*a'* and the vertical support 240*b'* which are separated from each other may be coupled to each other by welding or the like to more firmly support the unit battery cells 210 at sides.

The vertical supports 240*b'* of the battery modules 200' that are vertically stacked may be aligned with each other. In this case, each of lower frame bent portions 232 may be divided into an upper area and a lower area, and a lower end of the vertical support 240*b'* of an upper battery module 200' may be connected to the upper area and an upper end of the vertical support 240*b'* of a lower battery module 200' may be connected to the lower area.

Figure 7:
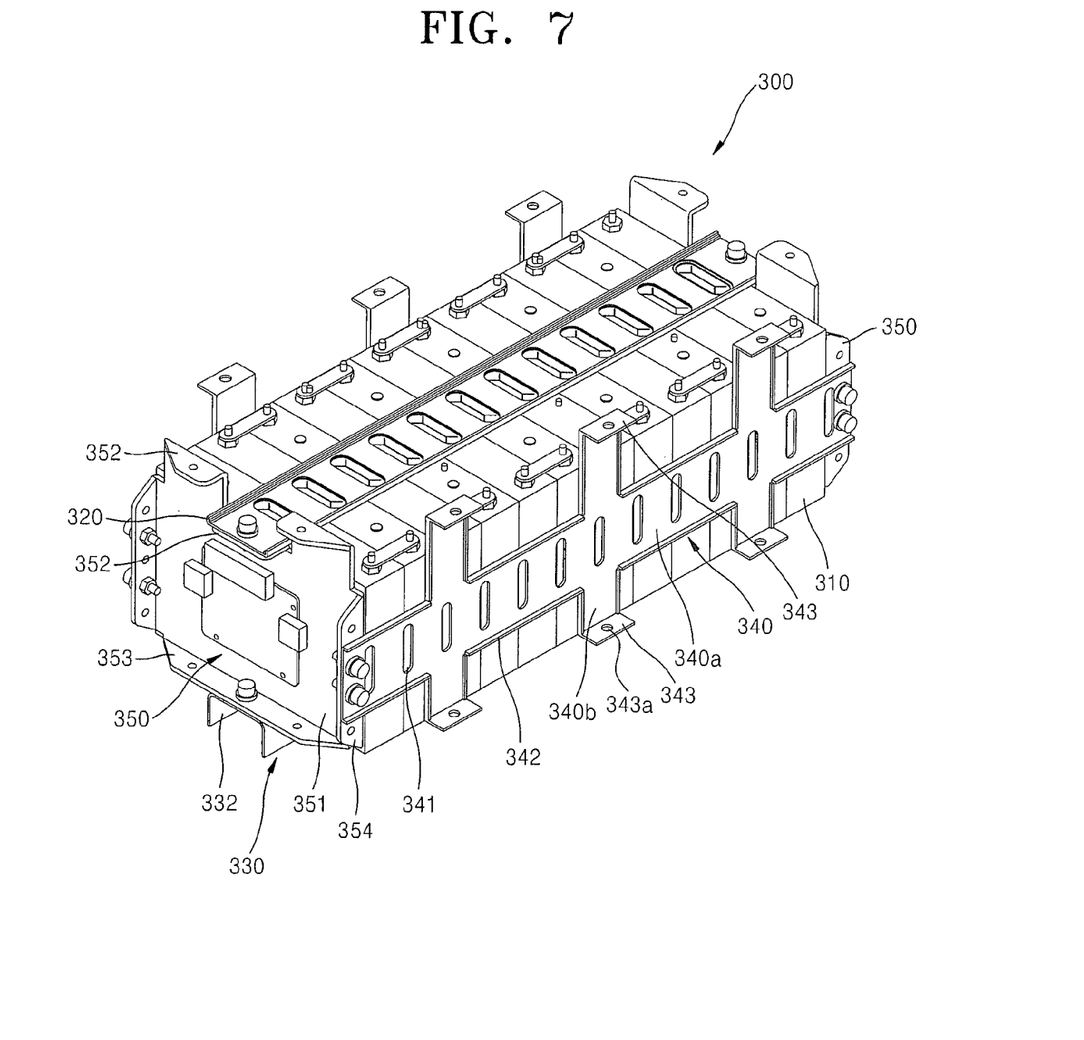
FIG. 7 is a perspective view of a battery module, which is formed by horizontally stacking a plurality of unit battery cells, of a battery pack according to another embodiment of the present invention.
Figure 8:
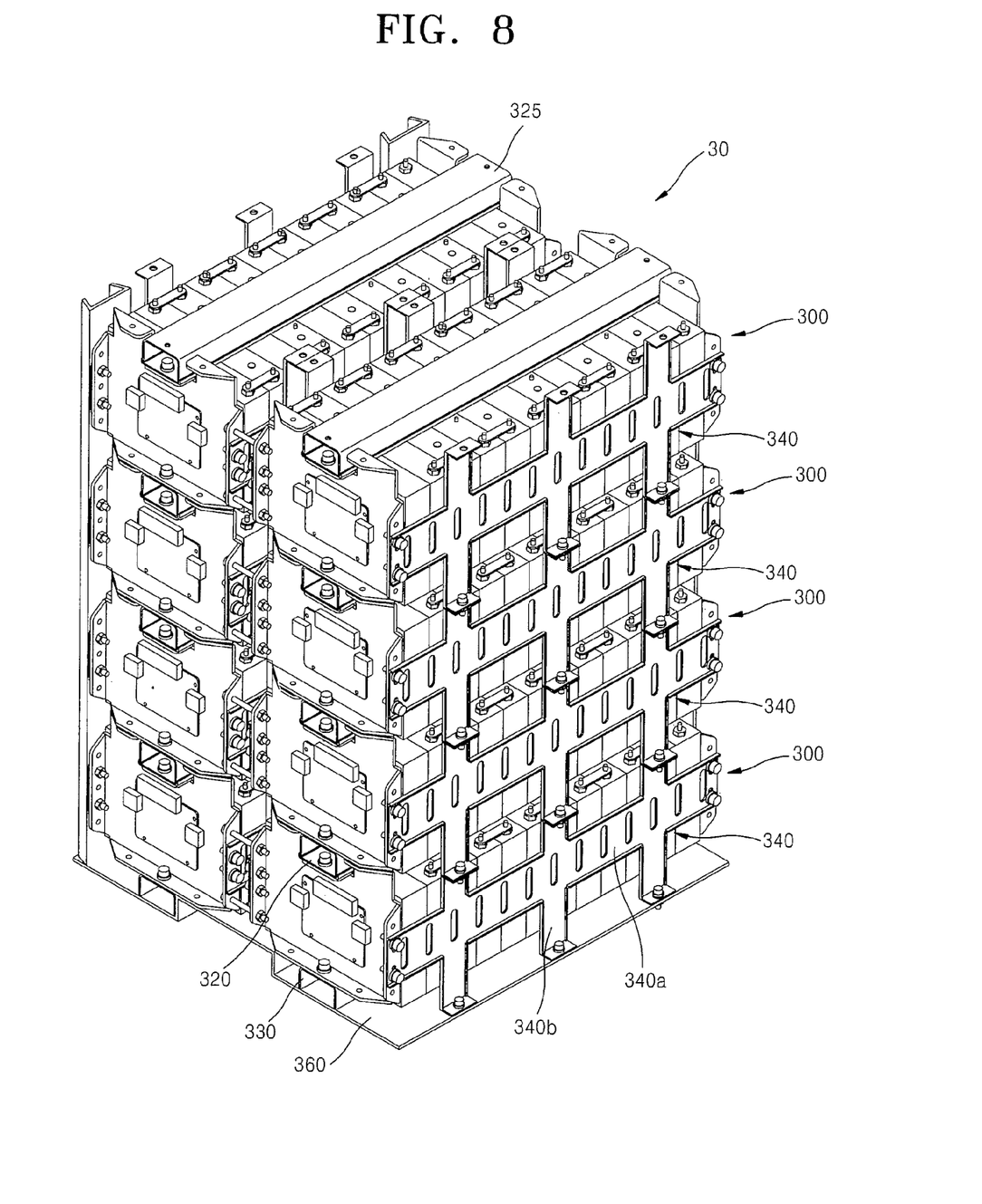
FIG. 8 is a perspective view of the battery pack of FIG. 7 which vertically supports unit battery cells included in battery modules by using vertical supports.
Figure 9:
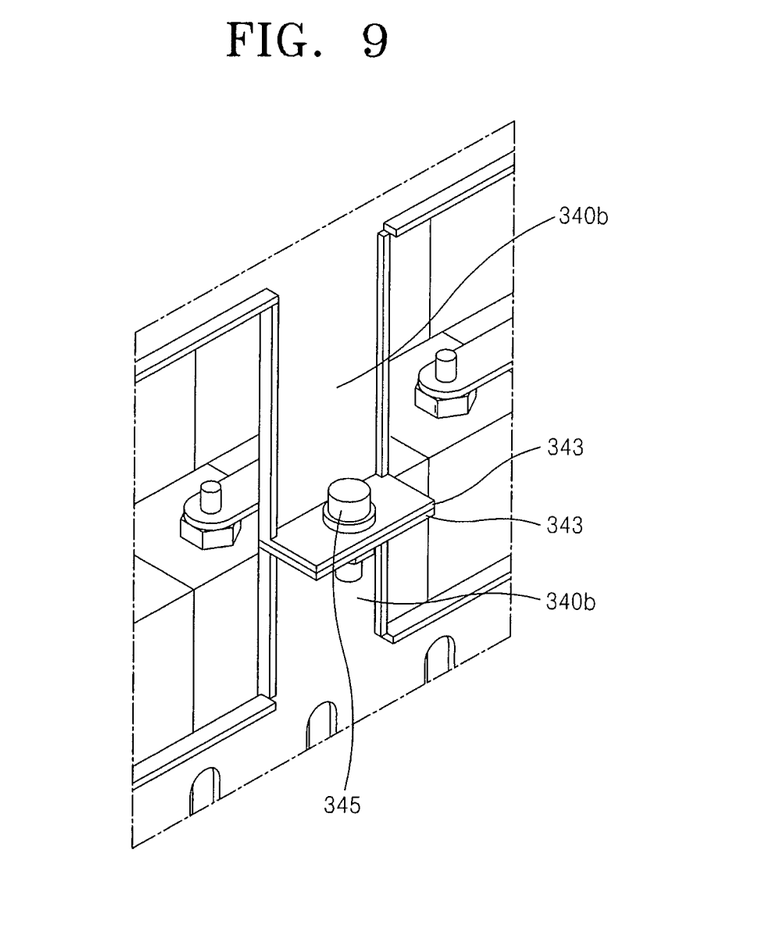
FIG. 9 is a schematic view illustrating coupling portions of vertical supports of the battery modules that are vertically stacked of the battery pack of FIG. 7.

FIGS. 7 through 9 illustrate a battery pack 30 according to another embodiment of the present invention. The battery pack 30 is supported because neighbouring vertical supports 340*b* of battery modules 300 that are vertically stacked are connected to each other.

The battery pack 30 of FIGS. 7 through 9 is the same as the battery pack 20 of FIG. 6 except the following explained below. Accordingly, like elements for performing the same functions as those of the battery pack 20 are denoted by like reference numerals and a detailed explanation thereof will not be given.

Referring to FIGS. 7 through 9, the battery pack 30 may be formed by vertically and/or horizontally stacking the battery modules 300. Each of the battery modules 300 may include a plurality of unit battery cells 310, an upper frame 320, a lower frame 330, side supports 340, and end plates 350.

Each of the side supports 340 may include a horizontal support 340a and vertical supports 340b. The horizontal support 340a may extend with a predetermined width from one end plate 350 to the other end plate 350. The vertical supports 340b may be located at sides between the battery modules 300 that are vertically stacked.

Accordingly, the horizontal support 340a may internally support the unit battery cells 310 at a side of the battery module 300. The vertical supports 340b may internally and/or vertically support the unit battery cells 310.

Accordingly, the vertical supports 340b may support portions of the battery module 300 to be deflected. Accordingly, the vertical supports 340b may reduce deflection and oscillation of the battery module 300.

The vertical supports 340b may not be coupled to the lower frame 330 but the vertical supports 340b that are vertically stacked may be coupled to each other to vertically support the battery pack 30. An upper end of a current vertical support 340b may be connected to a lower end of an upper vertical support 340b, and a lower end of the current vertical support 340b may be connected to an upper end of a lower vertical support 340b.

The vertical supports 340 which are coupled to each other may have coupling portions 340 which are bent. In this case, surfaces of the coupling portions 343 of the vertical supports 340b that are vertically stacked may contact each other to vertically support the battery module 300.

Referring to FIGS. 7 & 9, a through-hole 343a may be formed in each of the coupling portions 343 of the vertical supports 340b, and the vertical supports 340b may be coupled onto each other with a fastener 345 such as a bolt and nut. However, the present embodiment is not limited thereto, and the neighbouring vertical supports 340 may be coupled to each other in various ways including welding.

In this case, a lower end of the vertical support 340b of a lowermost battery module 300 may be coupled to a base frame 360. An upper end of the vertical support 340b of an uppermost battery module 300 may be coupled to a cover frame or an external frame.

Lower frame bent portions 332 may form a gas passage by being coupled to the upper frame 320 of a lower battery module 300. To this end, the lower frame 330 may have a width corresponding to that of the upper frame 320. A gas passage formed by coupling the lower frame 330 and the upper frame 320 of the battery modules that are vertically stacked may act as a duct through which generated gas is discharged.

The end plates 350 may include the base plate 351 and flanges 352, 353, and 354 that are bent from the base plate 351 away from the unit battery cells 310.

The flanges 352, 353, and 354 may include an upper flange 352, a lower flange 353, and side flanges 354. The upper flange 352 is coupled to the upper frame 320. The lower flange 353 is coupled to the lower frame 330. The side flanges 352 are coupled to the side supports 340.

The upper flange 352 may be coupled to the lower flange of an upper battery module 300. The lower flange 353 may be coupled to the upper flange 352 of a lower battery module 300. The side flanges 354 may be coupled to the side flanges 354 of neighbouring battery modules 300.

The upper flange 352, the lower flange 353, and the side flanges 354 may be screwed onto the upper frame 320, the lower frame 330, and the side supports 340, respectively, with bolts and nuts. However, the present embodiment is not limited thereto and the upper flange 352, the lower flange 353, and the side flanges 354 may be coupled to the upper frame 320, the lower frame 330, and the side supports in various ways including welding.

Figure 10:
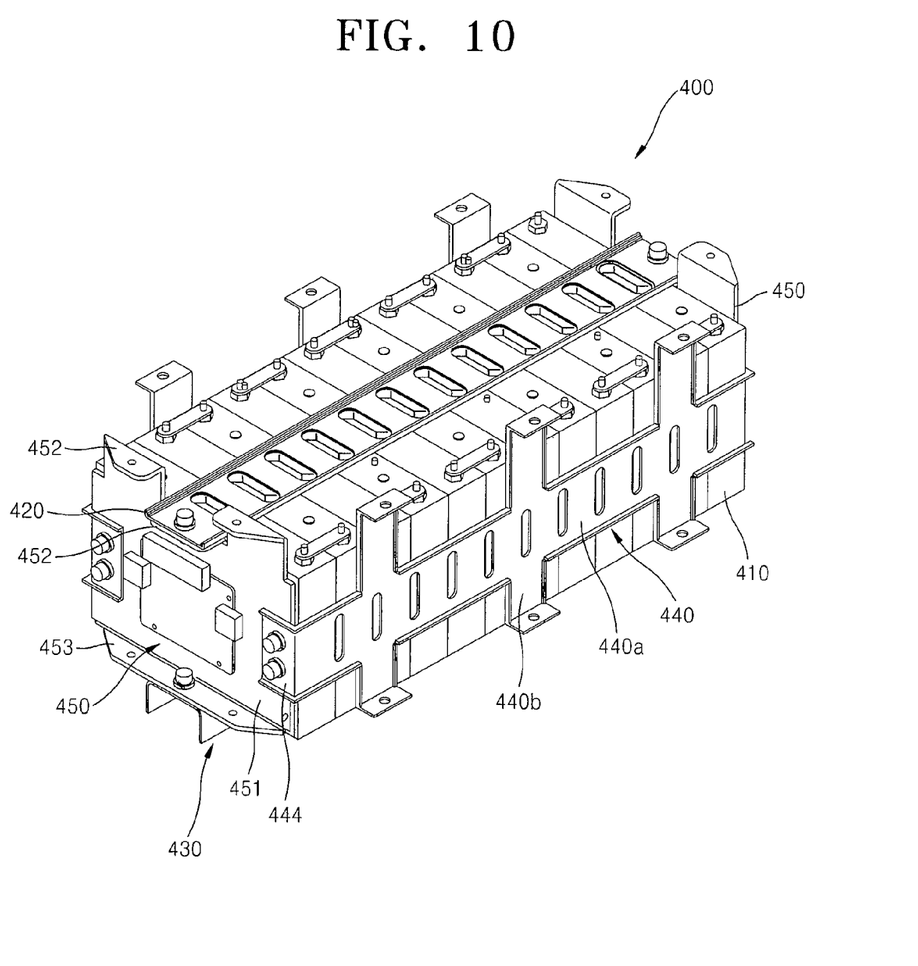
FIG. 10 is a perspective view of a battery module, which is formed by horizontally stacking a plurality of unit battery cells, of a battery pack according to another embodiment of the present invention.

Alternatively, the flanges 352, 353, and 354 used to couple the end plates 350 to the side supports 340 may be formed on the side supports 340, not on the end plates 350. FIG. 10 is a perspective view of a battery module 400 having flanges 444 formed on side supports 440 to be coupled to end plates 450. Referring to FIG. 10, the side supports 440 extending to cross a plurality of unit battery cells 410 that are aligned may include the flanges 444 bent to surround the end plates 450. Each of the end plates 450 includes a base plate 451 contacting an outermost unit battery cell 410, a top flange 452 bent from the base plate 451 and coupled to an upper frame 420, and a lower flange 453 coupled to a lower frame 430.

Flat left and right edge portions of each of the end plates 450 may contact the flanges 444 of the side supports 440 extending to surround the end plates 450 and may be coupled or welded to the flanges 444 of the side supports 440 by using appropriate means.

The features of horizontal supports 440a and vertical supports 440b of the side supports 440 are the same as their counterparts stated above, and thus a detailed explanation thereof will not be given.

The battery pack 10 may be applied to an electric vehicle.

When gas is generated in the battery pack 10 including the unit battery cells 110 due to explosion or some other reason, poisonous gas is explosively generated in a short time. If the poisonous gas flows into a space occupied by people, the people may be harmed by the poisonous gas.

The battery pack 10 may be received and sealed in a sealing case, and the sealing case may be connected to an external space through an external duct. Accordingly, since the battery pack 10 is connected to the external duct, exhaust gas may be discharged to the outside of the electric vehicle.

The electric vehicle may use the battery pack 10 mounted in a vehicle body. A dynamic load may be applied to the battery pack 10 as the electric vehicle 1 runs. In this case, the battery modules 100 that are vertically and/or horizontally stacked may suffer deflection and/or oscillation.

However, since the vertical supports 140b support portions of the battery modules 100 to be deflected, the battery pack 10 may reduce the deflection and oscillation of the battery modules 100.

As described above, the battery pack formed by vertically and/or horizontally stacking battery modules, each of which is formed by stacking a plurality of unit battery cells, according to the one or more embodiments of the present invention may reduce deflection of the battery modules.

The battery pack according to the one or more embodiments of the present invention has been specifically described. However, the above descriptions are intended to assist the understanding of the invention, and thus the above-described embodiments can be variously modified by those of ordinary skill in the art. Accordingly, the technical scope of the one or more embodiments of the present invention for which protection is sought should be defined by the following claims.

What is claimed is:

1. A battery pack comprising:
a plurality of battery modules stacked together, at least one of the plurality of battery modules comprising:
a plurality of unit battery cells each having a cap plate, the battery cells being stacked together in a first direction such that front and rear surfaces of respective adjacent ones of the unit battery cells abut each other and side surfaces thereof are exposed; and
a housing comprising:
at least one side support comprising a first support having a longitudinal axis extending in the first direction and a second support having a longitudinal axis extending in a second direction crossing the first direction, wherein the first support and the second support are coplanar and both directly contact a single one of the side surfaces of at least one of the unit battery cells; and
a pair of end plates coupled to respective longitudinal ends of the first support in the first direction;
a first frame on the battery cells and having a plurality of exhaust outlets;
a cover covering the first frame and a portion of the cap plate of each of the battery cells, wherein the second support covers a portion of the cover and wherein the cover forms a passage for discharging gas;
wherein the longitudinal axis of the second support extends generally in a direction from a first one of the battery modules to a second one of the battery modules; and
wherein the second support of a first one of the battery modules contacts a second one of the battery modules.

2. The battery pack of claim 1, wherein the at least one side support has a single integral structure.

3. The battery pack of claim 1, wherein the first support and the second support are separate structures coupled together.

4. The battery pack of claim 1, wherein the at least one side support further comprises at least one additional second support.

5. The battery pack of claim 1, wherein the second support is coupled to the first frame.

6. The battery pack of claim 1, wherein the second support of a first one of the battery modules overlaps with the second support of a second one of the battery modules.

7. The battery pack of claim 1, wherein the second support of the first one of the battery modules is welded to the second support and to the first frame of the second one of the battery modules.

8. The battery pack of claim 1, wherein the longitudinal axis of the second support of a first one of the battery modules is substantially co-linear with the longitudinal axis of the second support of a second one of the battery modules.

9. The battery pack of claim 1, wherein the at least one side support has a plurality of openings.

10. The battery pack of claim 1, wherein the second support of a first one of the battery modules is coupled to the second support of a second one of the battery modules.

11. The battery pack of claim 1, wherein the second support has a coupling flange extending from an edge thereof in a direction away from the plurality of unit battery cells.

12. The battery pack of claim 11, wherein the coupling flange has an opening adapted to receive a fastener.

13. The battery pack of claim 11, wherein the coupling flange of the second support of a first one of the battery modules is coupled to the coupling flange of the second support of a second one of the battery modules by a fastener.

14. The battery pack of claim 1, wherein the battery pack is configured to power a vehicle.

15. The battery pack of claim 1, wherein the battery modules are stacked together in both a longitudinal direction and a lateral direction.

16. The battery pack of claim 15, wherein each of the battery modules are fixed to at least one adjacent one of the battery modules in at least one of the longitudinal direction or the lateral direction.

17. The battery pack of claim 1, wherein the at least one side support further comprises a bent portion adapted to be fixed to one end plate of the pair of end plates.

18. The battery pack of claim 1, wherein each of the unit battery cells comprises a vent configured to be fractured when a preset internal pressure is reached.

* * * * *